(12) United States Patent
Schwiebert et al.

(10) Patent No.: US 11,907,640 B2
(45) Date of Patent: Feb. 20, 2024

(54) SYSTEMS AND METHODS FOR CONVERTING EMBEDDED FONT TEXT DATA

(71) Applicant: Canva Pty Ltd, Surry Hills (AU)

(72) Inventors: Stephan Schwiebert, Sydney (AU); Velislava Yanchina, Surry Hills (AU); Henrry Eduardo Iguaro Jaramillo, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/741,561

(22) Filed: May 11, 2022

(65) Prior Publication Data
US 2022/0382962 A1 Dec. 1, 2022

(30) Foreign Application Priority Data
Jun. 1, 2021 (AU) ................................ 2021203578

(51) Int. Cl.
*G06F 40/109* (2020.01)
*G06F 40/166* (2020.01)
*G06F 40/106* (2020.01)

(52) U.S. Cl.
CPC .......... *G06F 40/109* (2020.01); *G06F 40/106* (2020.01); *G06F 40/166* (2020.01)

(58) Field of Classification Search
CPC .... G06F 40/109; G06F 3/1208; G06F 40/103; G06F 40/126; G06F 40/166; G06F 40/106
See application file for complete search history.

(56) References Cited

U.S. PATENT DOCUMENTS

| | | | | |
|---|---|---|---|---|
| 5,859,648 A | * | 1/1999 | Moore | G06K 15/02 715/234 |
| 6,853,980 B1 | * | 2/2005 | Ying | G06Q 30/06 705/26.62 |
| 8,762,836 B1 | * | 6/2014 | Hsu | G06F 40/109 715/236 |
| 2004/0163052 A1 | * | 8/2004 | Ducato | G06F 3/1285 715/269 |

(Continued)

FOREIGN PATENT DOCUMENTS

EP 0870246 A1 10/1998

OTHER PUBLICATIONS

European Search Report for EP22173863 dated Nov. 2, 2022.

*Primary Examiner* — Wilson W Tsui
(74) *Attorney, Agent, or Firm* — GrowIP Law Group LLC

(57) ABSTRACT

A computer implemented method includes receiving embedded font text defining characters associated with an original font family. The embedded font text is processed to generate original glyph metrics data, a combined original font glyph width based on the original glyph metrics data, and one or more candidate font families are identified. For each candidate font family a combined candidate font family glyph width is calculated and a candidate font family difference, the candidate font family difference being a measure of how the candidate font family's combined candidate font family glyph width compares to the combined original font glyph width. A particular candidate font family is selected as a replacement font family based on the candidate font family differences of the one or more candidate font families.

14 Claims, 8 Drawing Sheets

(56) References Cited

U.S. PATENT DOCUMENTS

| | | | |
|---|---|---|---|
| 2006/0170685 A1* | 8/2006 | Wilson Brown | G06F 40/126 |
| | | | 345/467 |
| 2009/0109227 A1* | 4/2009 | Leroy | G06T 11/203 |
| | | | 345/467 |
| 2011/0276872 A1* | 11/2011 | Kataria | G06F 40/109 |
| | | | 715/764 |
| 2012/0229517 A1 | 9/2012 | Plummer | |
| 2014/0108897 A1* | 4/2014 | Boutelle | G06F 40/109 |
| | | | 715/201 |
| 2014/0365881 A1* | 12/2014 | Suarez | G06F 40/109 |
| | | | 715/269 |
| 2015/0186758 A1* | 7/2015 | Kuroki | G06K 15/1825 |
| | | | 358/1.11 |

* cited by examiner

*Figure 1*

120 → [box 102]

The chateau into which my valet had ventured to make forcible entrance, rather than permit me, in my desperately wounded condition, to pass a night in the open air, was one of those piles of commingled gloom and grandeur which have so long frowned among the Appenines, not less in fact than in the fancy of Mrs. Radcliffe. To all appearance it had been temporarily and very lately abandoned. We established ourselves in one of the smallest and least sumptuously furnished apartments. It lay in a remote turret of the building. Its decorations were rich, yet tattered and antique. Its walls were hung with tapestry and bedecked with manifold and multiform armorial trophies, together with an unusually great number of very spirited modern paintings in frames of rich golden arabesque. In these paintings, which depended from the walls not only in their main surfaces, but in very many nooks which the bizarre architecture of the chateau rendered necessary—in these paintings my incipient delirium, perhaps, had caused me to take deep interest; so that I bade Pedro to close the heavy shutters of the room—since it was already night—to light the tongues of a tall candelabrum which stood by the head of my bed—and to throw open far and wide the fringed curtains of black velvet which enveloped the bed itself. I wished all this done that I might resign myself, if not to sleep, at least alternately to the contemplation of these pictures, and the perusal of a small volume which had been found upon the pillow, and which purported to criticise and describe them.

130 → [box 102]

The chateau into which my valet had ventured to make forcible entrance, rather than permit me, in my desperately wounded condition, to pass a night in the open air, was one of those piles of commingled gloom and grandeur which have so long frowned among the Appenines, not less in fact than in the fancy of Mrs. Radcliffe. To all appearance it had been temporarily and very lately abandoned. We established ourselves in one of the smallest and least sumptuously furnished apartments. It lay in a remote turret of the building. Its decorations were rich, yet tattered and antique. Its walls were hung with tapestry and bedecked with manifold and multiform armorial trophies, together with an unusually great number of very spirited modern paintings in frames of rich golden arabesque. In these paintings, which depended from the walls not only in their main surfaces, but in very many nooks which the bizarre architecture of the chateau rendered necessary—in these paintings my incipient delirium, perhaps, had caused me to take deep interest; so that I bade Pedro to close the heavy shutters of the room—since it was already night—to light the tongues of a tall candelabrum which stood by the head of my bed—and to throw open far and wide the fringed curtains of black velvet which enveloped the bed itself. I wished all this done that I might resign myself, if not to sleep, at least alternately to the contemplation of these pictures, and the perusal of a small volume which had been found upon the pillow, and which purported to criticise and describe them.

*Figure 1 (Cont.)*

SYSTEMS AND METHODS FOR CONVERTING EMBEDDED FONT TEXT DATA

CROSS-REFERENCE TO RELATED APPLICATION

This application is a U.S. Non-Provisional Application that claims priority to Australian Patent Application No. 2021203578, filed Jun. 1, 2021, which is hereby incorporated by reference in its entirety.

TECHNICAL FIELD

Aspects of the present disclosure are directed to systems and methods for converting embedded font text data.

BACKGROUND

Certain document formats allow fonts to be embedded in a document. The Portable Document Format (PDF) is one example of such a format.

Often it is desirable—or necessary—to convert embedded font text from text of one font to text of a different font. For example, when importing embedded font text from an existing document into a new document that is being created/edited by a new document editing application, the new document editing application may not support one or more fonts defined in the original text data.

Where an original font is not supported, a replacement font must be selected for the text in the new document. Selecting a replacement font can, however, be problematic, and a poorly chosen replacement font can have a significant impact on the appearance and/or readability of the imported text in the new document.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method including: receiving embedded font text, the embedded font text defining characters associated with an original font family, the original font family being an unsupported font family; processing the embedded font text to generate original glyph metrics data, the original glyph metrics data defining glyphs used in the embedded font text; calculating a combined original font glyph width based on the original glyph metrics data; identifying one or more candidate font families, each candidate font family associated with a plurality of candidate font family glyphs; for each candidate font family: calculating a combined candidate font family glyph width, the combined candidate font family glyph width being based on the candidate font family's candidate font family glyphs and the original glyph metrics data; calculating a candidate font family difference, the candidate font family difference being a measure of how the candidate font family's combined candidate font family glyph width compares to the combined original font glyph width; and selecting a particular candidate font family as a replacement font family based on the candidate font family differences of the one or more candidate font families.

Also described herein is a computer implemented method for importing original text into an application, the original text being embedded font text, the method including: receiving the original text; determining an original font family associated with one or more characters of the original text; determining that the original font family is an unsupported font family that is not supported by the application; in response to determining that the original font family is an unsupported font family: determining if the original font family is a known font family by accessing replacement font mapping data, the original font family being a known font family if it is referenced in the replacement font mapping data; and in response to determining that the original font family is a known font family, generating converted text data by: selecting a replacement font family, the replacement font family being a supported font family that is associated with the original font family in the replacement font mapping data; converting the one or more characters of the original text to the selected replacement font family; and using a spacing modifier to determine a spacing of the one or more characters in the converted text data, the spacing modifier associated with the original font family and the selected replacement font family in the replacement font mapping data.

BRIEF DESCRIPTION OF THE DRAWINGS

In the drawings:

FIG. 1 provides depictions of example text.

Figure 2:
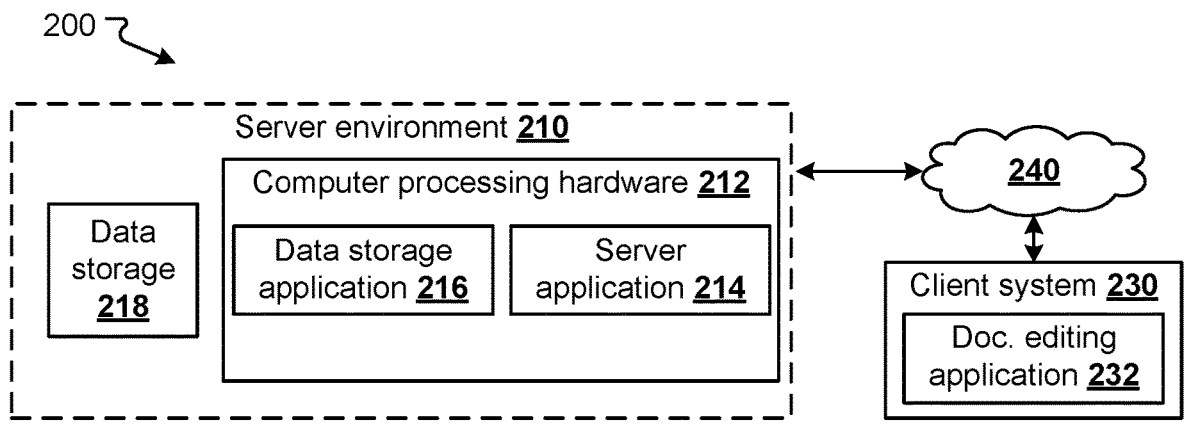
FIG. 2 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, some document formats (such as PDF) allow for embedded font data. Documents making use of embedded font data will be referred to as embedded font documents.

Many scenarios arise where one or more fonts used by text in an embedded font document need to be converted to alternative fonts. One example of this can arise when embedded font text is imported into a new document that has been created/is being edited by a new document editing application (i.e. a different application than was used to create the original document). In such an import operation, one or more fonts defined in the original embedded font document (or one or more glyphs that would be needed to render the original document) may not be supported by or available to the new document editing application. In this case, one or more replacement fonts must be selected for use in the new document.

Different fonts have, however, different metrics. One such metric is font width, which has a significant impact on both how text appears in a document and how readable (or otherwise) the text is.

Figure 1:
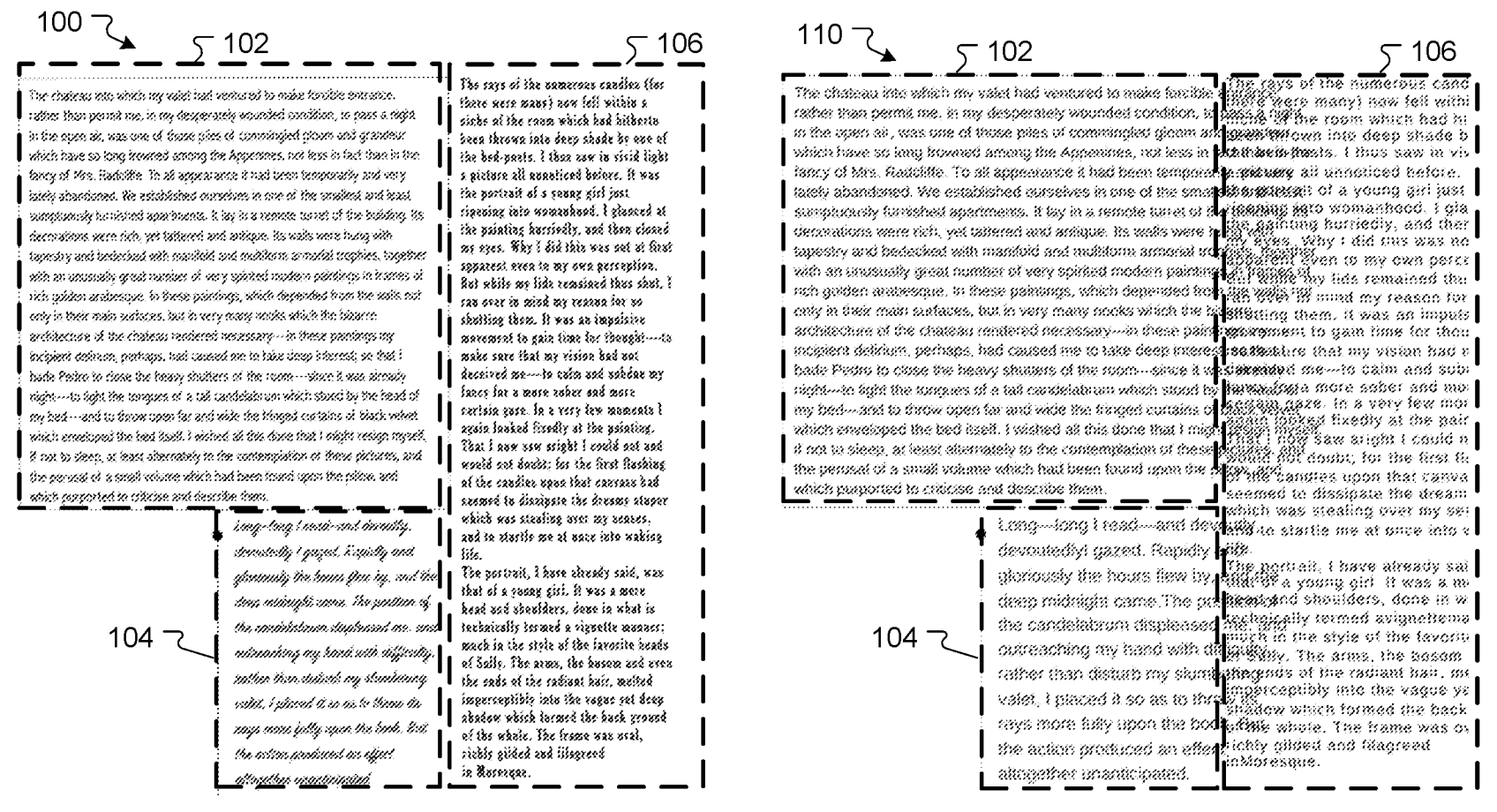

To illustrate the types of issues that can arise, consider for example FIG. 1 which illustrates a portion of an original embedded font document 100 which includes first and second and third text regions indicated by broken line rectangles 102, 104, and 106 respectively. FIG. 1 also illustrates a portion of new document 110 into which the text from the original embedded font document has been imported. Broken line rectangles 102, 104, and 106 indicating the three text regions of the first document 110 are also displayed in the new document 110. In importing the text data into the new document, new fonts have been selected and the original text converted into those fonts. As can be seen, the widths of the new fonts differ to those of the original fonts and, as a result, the text no longer fits within the original text regions 102/104/106. For example, the text from regions 102 and 104 encroaches into region 106 (overlapping and obscuring the text in that text region).

One mechanism for attending to this overlap would be to modify the character spacing of the imported text in an attempt to make the imported text fit into its original footprint—e.g. in FIG. 1 to make the text from the original document text region 102 fit into the corresponding region in the new document 110 despite the font change. This approach may serve to fit the text in to the required region, however adjusting the character spacing in this way can make the text difficult to read (and, more generally, compromise its appearance). To illustrate this, consider the further (partial) version 120 of original document 100 shown in FIG. 1. In further version 120, the font of the original text from text region 102 has been changed (as per 110) however the character spacing of the original text has been adjusted to fit the original text in text region 102. As a result, the text in version 120 is both difficult to read and unsightly.

In order to address, or at least ameliorate, this issue, the present disclosure provides systems and methods for selecting replacement fonts when importing embedded font data into an application that does not support all fonts defined by that data. Generally speaking, where an unsupported font is identified, the systems and methods described herein process embedded font text data and available font data to determine a replacement font that matches or closely matches the width of the original, unsupported font. If the replacement font sufficiently matches the original font, modified character spacing may be avoidable. If not, a replacement font is selected to try and minimise character spacing modification. To illustrate this, FIG. 1 depicts yet a further (partial) version 130 of original document 100. Version 130 is similar to version 120, excepting that a different conversion font has (in accordance with the techniques described below) been identified for the original text in region 102. By selecting the alternative conversion font for version 130, less adjustment to the character spacing of the text in region 102 is required and, therefore, the text in region 102 of version 130 is more readable.

For clarity, the specific text depicted in FIG. 1 need not be legible for the purposes of understanding the present disclosure.

The techniques and features of the present disclosure will be described in the context of importing embedded font text from an original document (e.g. a PDF document) into an editable document. The editable document (and editing operations that can be performed in relation to that document) is provided by a document editing application.

The techniques described herein can be used with a wide variety of editable document formats and by a wide variety of document editing applications. For example, the editable document may be a design document (rendered and edited by a design application), a word processing document (rendered and edited by a word processing application), or any other document format into which embedded font text can be imported (and which is managed by an appropriate document editing application).

In one implementation, the document editing application is a client server type application (though in other embodiments the document editing application may be a stand-alone application). Turning to FIG. 2, an example networked environment 200 in which such a client server type application may operate—and the operations and techniques described herein can be performed—will be described.

Networked environment 200 includes a server environment 210 and a client system 230 which communicate via one or more communications networks 240 (e.g. the Internet).

Generally speaking, the server environment 210 includes computer processing hardware 212 (discussed below) on which applications that provide server-side functionality to client applications such as document editing application 232 (described below) execute. In the present example, server environment 210 includes a server application 214 (which may also be referred to as a front end server application) and a data storage application 216.

The server application 214 executes to provide a client application endpoint that is accessible over communications network 240. To do so, the server application 214 may include one or more application programs, libraries, APIs or other software elements that implement the features and functions that are described herein. For example, where server application 214 serves web browser client applications the server application 214 will be a web server which receives and responds to, for example, HTTP application protocol requests. Where server application 214 serves native client applications, server application 214 will be an application server configured to receive, process, and respond to API calls from those client applications The server environment 210 may include both web server and application server applications allowing it to interact with both web and native client applications.

In the present example the server environment 210 provides services/functions related to editable documents and as such will typically provide (alone or in conjunction with document editing application 232) functions such as document creation, document editing, document saving, document sharing/publication, and/or other relevant functions. In addition to the specific functionality described herein, the server application 214 (alone or in conjunction with other applications) may provide additional functions that are typically provided by server systems—for example user account creation and management, user authentication, and/or other server side functions.

The data storage application 216 executes to receive and process requests to persistently store and retrieve data that is relevant to the operations performed/services provided by the server environment 210. Such requests may be received from the server application 214, other server environment applications, and/or (in some instances) directly from client applications such as 232. Data relevant to the operations performed/services provided by the server environment 210 may include, for example, user account data, document data (i.e. data describing documents that have been created by users), and/or other data relevant to the operation of the server application 214 as described below.

The data storage application 216 may, for example, be a relational database management application or an alternative application for storing and retrieving data from data storage 218. Data storage 218 may be any appropriate data storage device (or set of devices), for example one or more non transient computer readable storage devices such as hard disks, solid state drives, tape drives, or alternative computer readable storage devices.

In server environment 210, server application 214 persistently stores data to data storage device 218 via the data storage application 216. In alternative implementations, however, the server application 214 may be configured to directly interact with data storage devices such as 218 to store and retrieve data (in which case a separate data storage application may not be needed). Furthermore, while a single data storage application 216 is described, server environment 210 may include multiple data storage applications. For example one data storage application 216 may be used for user data, another for document data, and one or more further data storage applications 216 used for data relating to the font replacement operations described herein. In this case, each data storage application may interface with one or more shared data storage devices and/or one or more dedicated data storage devices, and each data storage application may receive/respond to requests from various server-side and/or client-side applications (including, for example server application 214).

As noted, the server application 214 and data storage application 216 run on (or are executed by) computer processing hardware 212. Computer processing hardware 212 includes one or more computer processing systems. The precise number and nature of those systems will depend on the architecture of the server environment 210.

For example, in one implementation a single server application 214 runs on its own computer processing system and a single data storage application 216 runs on a separate computer processing system. In another implementation, a single server application 214 and a single data storage application 216 run on a common computer processing system. In yet another implementation, server environment 210 may include multiple server applications running in parallel (on one or multiple computer processing systems).

In a further implementation, server environment 210 is a scalable environment in which application instances (and the computer processing hardware 212—i.e. the specific computer processing systems required to run those instances) are commissioned and decommissioned according to demand—e.g. in a public or private cloud-type system. In this case, server environment 210 may simultaneously run multiple server applications 214 and/or multiple data storage applications 216 (on one or multiple computer processing systems) as required by client demand. Where sever environment 210 is a scalable system it will include additional applications to those illustrated and described. As one example, the server environment 210 may include a load balancing application which operates to determine demand, direct client traffic to the appropriate server application instance 214 (where multiple server applications 214 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 210 may be by any appropriate means, for example direct communication or networked communication over one or more local area networks, wide area networks, and/or public networks (with a secure logical overlay, such as a VPN, if required).

The present disclosure describes various operations that are performed by applications of the server environment 210. Generally speaking, however, operations described as being performed by a particular application (e.g. server application 214) could be performed by one or more alternative applications, and/or operations described as being performed by multiple separate applications could in some instances be performed by a single application.

Client system 230 hosts a document editing application 232 which, when executed by the client system 230, configures the client system 232 to provide client-side functionality/interact with sever environment 210 (or, more specifically, the server application 214 and/or other application provided by the server environment 210). Via the document editing application 2322, a user can interact with (for example) the server application 214 in order to perform various operations such as creating, editing, saving, retrieving/accessing, publishing, and sharing documents.

The document editing application 232 may be a general web browser application which accesses the server application 214 via an appropriate uniform resource locator (URL) and communicates with the server application 214 via general world-wide-web protocols (e.g. http, https, ftp). Alternatively, the document editing application 232 may be a native application programmed to communicate with server application 214 using defined application programming interface (API) calls.

A given client system such as 230 may have more than one document editing application 232 installed and executing thereon. For example, a client system 230 may have a (or multiple) general web browser application(s) and a native client application.

The techniques and operations described herein are performed by one or more computer processing systems.

By way of example, client system 230 may be any computer processing system which is configured (or configurable) by hardware and/or software to offer client-side functionality. A client system 230 may be a desktop computer, laptop computers, tablet computing device, mobile/smart phone, or other appropriate computer processing system.

Similarly, the applications of server environment 210 are also executed by one or more computer processing systems. Server environment computer processing systems will typically be server systems, though again may be any appropriate computer processing systems.

Figure 3:
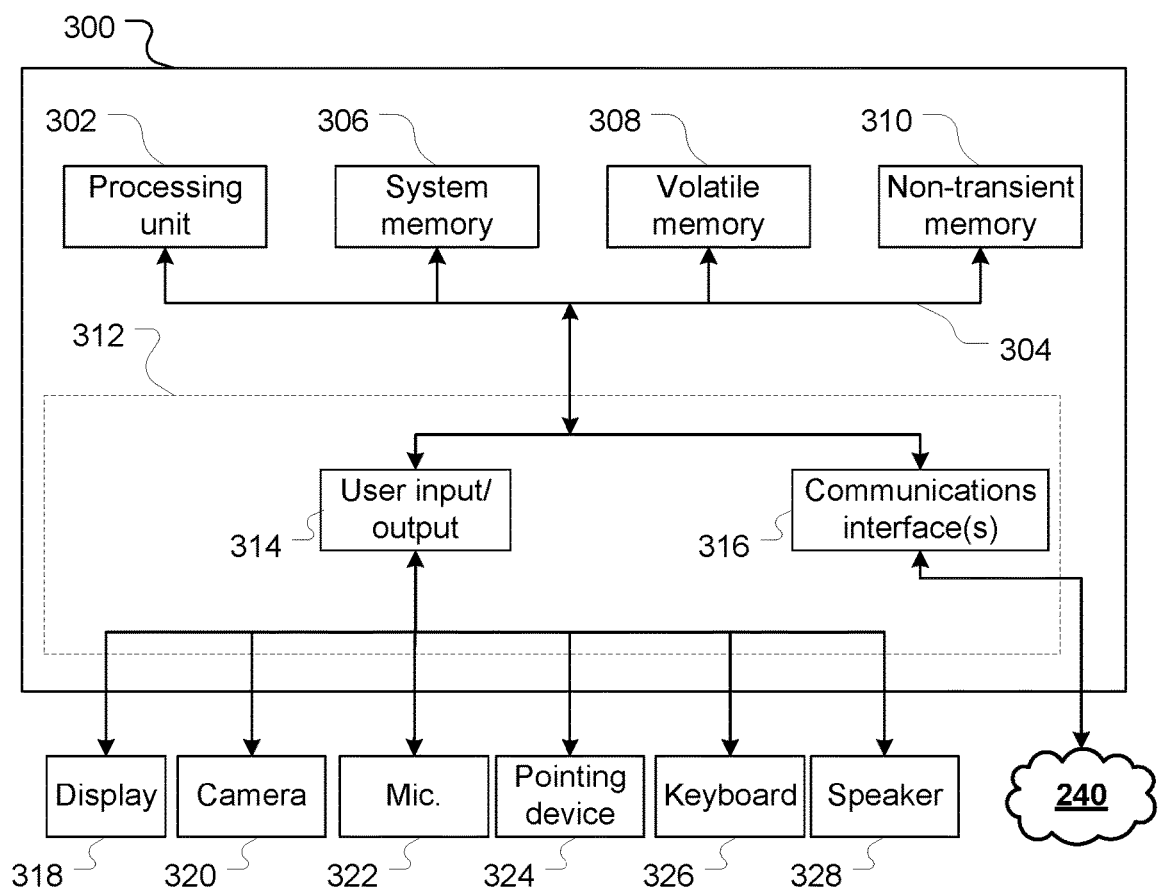
FIG. 3 is a block diagram of a computer processing system configurable to perform various features of the present disclosure.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304 the processing unit 302 is in data communication with a one or more machine readable storage (memory) devices which store computer readable instructions and/or data which are executed by the processing unit 302 to control operation of the processing system 300. In this example system 300 includes a system memory 306 (e.g. a BIOS), volatile memory 308 (e.g. random access memory such as one or more DRAM modules), and non-transient memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 300 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 300 connects—whether by wired or wireless means—include one or more input devices to allow data to be input into/received by system 300 and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboard, mouse, trackpad, microphone, accelerometer, proximity sensor, GPS, and/or other input devices. System 300 may also include or connect to one or more output devices controlled by system 300 to output information. Such output devices may include devices such as a display (e.g. a LCD, LED, touch screen, or other display device), speaker, vibration module, LEDs/other lights, and/or other output devices. System 300 may also include or connect to devices which may act as both input and output devices, for example memory devices (hard drives, solid state drives, disk drives, and/or other memory devices) which system 300 can read data from and/or write data to, and touch screen displays which can both display (output) data and receive touch signals (input).

By way of example, where system 300 is a client system such as 230 it may include a display 318 (which may be a touch screen display), a camera device 320, a microphone device 322 (which may be integrated with the camera device), a pointing device 324 (e.g. a mouse, trackpad, or other pointing device), a keyboard 326, and a speaker device 328.

System 300 also includes one or more communications interfaces 316 for communication with a network, such as network 240 of environment 200 (and/or a local network within the server environment 210). Via the communications interface(s) 316, system 300 can communicate data to and receive data from networked systems and/or devices.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transient machine readable medium such as 310 accessible to system 300. Instructions and data may be transmitted to/received by system 300 via a data signal in a transmission channel enabled (for example) by a wired or wireless network connection over an interface such as communications interface 316.

Typically, one application accessible to system 300 will be an operating system application. In addition, system 300 will store or have access to applications which, when executed by the processing unit 302, configure system 300 to perform various computer-implemented processing operations described herein. For example, and referring to the networked environment of FIG. 2 above, server environment 210 includes one or more systems which run a server application 214, a data storage application 216. Similarly, client system 230 runs a document editing application 232.

In some cases part or all of a given computer-implemented method will be performed by system 300 itself, while in other cases processing may be performed by other devices in data communication with system 300.

In the present disclosure, the document editing application 232 configures the client system 230 to provide a document editing user interface (UI). Generally speaking, the document editing UI will allow a user to create, edit, and output documents.

Figures 4, 5:
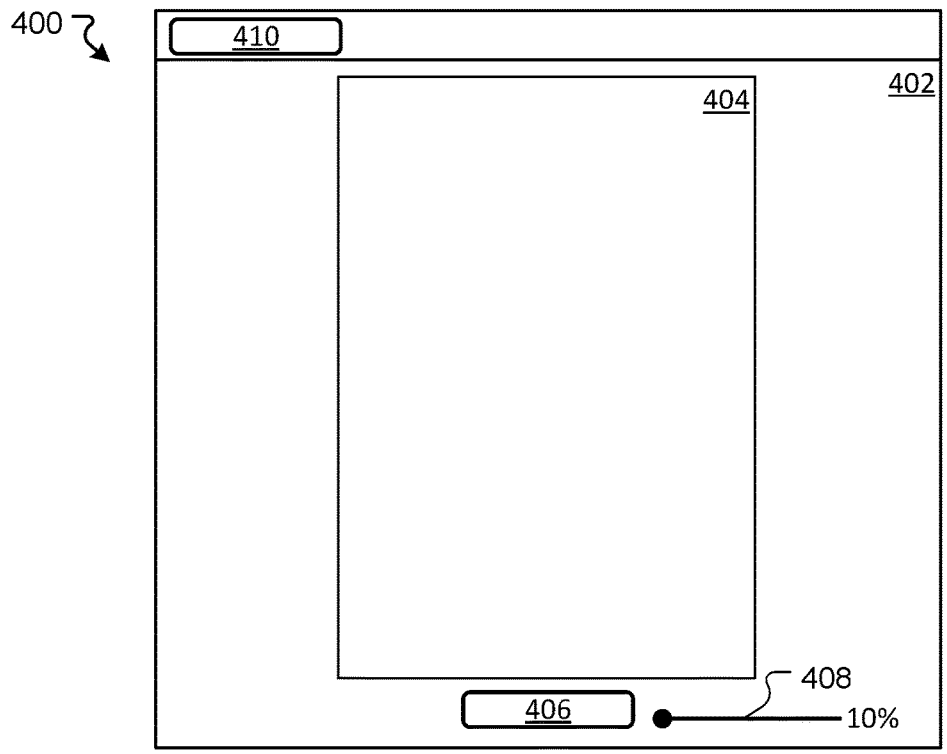
FIG. 4 depicts an example graphical user interface.
FIG. 5 depicts example text in different fonts and with different character spacings.

FIG. 4 provides a simplified and partial example of a document editing graphical user interface (GUI) 400. GUI 400 includes a document preview area 402 on which a canvas 404 is shown. Canvas 404 is used to display a page (or, in some cases multiple pages) of a document that is being created and/or edited. In this example an add page control 406 is provided (which, if activated by a user, causes a new page to be added to the design being created) and a zoom control 408 (which a user can interact with to zoom into/out of page currently displayed by canvas 404).

GUI 400 of the present example includes an import text control 410. Activation of this control allows a user to select an original document which then causes the document editing application 232 to import text therefrom into the current document. Document editing application 232 may provide additional and/or alternative mechanisms for importing text, for example keyboard shortcuts (e.g. a user may select to 'paste' previously copied text), a drag-and-drop functionality (by which a user can drag an original document and drop it—e.g. into document preview area 402), other explicit UI controls, and/or other mechanisms.

Alternative interfaces, with alternative layouts and/or alternative tools and functions, are possible. For example, a document editing GUI such as that partially depicted in FIG. 4 will typically include many other controls that permit documents to be created, edited (by creating/adding document element such as images, text, videos, and/or other elements), and output (e.g. exporting from a current format to an alternative format, saving to local memory, saving to a server data store such a 218, printing, publishing via social media, and/or other means) in various ways.

In order to determine replacement fonts, the systems and methods described herein make use of various data. In the described embodiments, this data includes supported fonts data, style normalisation data, style order data, and replacement font mapping data (each of which are discussed below).

The data used in the processing described herein is stored in computer readable memory and made accessible to the relevant processing application (e.g. the document editing application 232 and/or server application 214) as required. Where the methods described herein are performed by a stand-alone computer (e.g. such as client system 230), the data may be stored on memory of (or accessible to) that system—e.g. non-transient memory 310. Where the methods described herein are performed in a client-server type architecture, the data may be stored at the client system 230 and/or at the server environment 210 (e.g. at data storage 218).

The supported fonts data describes fonts that are available to and supported by the document editing application 232. Fonts defined by the supported fonts data will be referred to as supported (or directly supported fonts). Conversely, fonts that are not defined by the supported fonts data will be referred to as unsupported fonts.

A given font may belong to a font family. For example, the fonts 'Open Sans Bold Italic', 'Open Sans Regular', and Open Sans Extra-bold' are all members of the Open Sans font family. Where one or more fonts of a particular font family are supported, that particular font family will be referred to as a supported font family.

For each supported font, various data is stored that is used by document editing application 232 to render text (glyphs) in that font. This may include, for example, a font identifier (e.g. a font name such as "Open Sans Regular" or "Times New Roman Italic", a set of glyphs (e.g. data defining outlines of the available glyphs for the font), horizontal metrics (hmtx) data (used for horizontal text layout), and/or other data. By way of example, for TrueType fonts, each glyph outline may be defined as a set of straight line segments and quadratic Bezier curves.

In the present disclosure, certain supported font families are designated as potential replacement font families. A potential replacement font family is a font family that is supported and is considered when trying to determine a replacement for an unknown font (e.g. at 616 described below). For each potential replacement font family, the supported fonts data may also include normalised glyph width data for each (or certain) of the fonts in that family. The normalised glyph width data for a given potential replacement font family defines a normalised width of each glyph defined by that font. Normalised glyph widths may be determined or calculated in various ways, one example of which is described with reference to operations 704 and 706 below. (In alternative embodiments, normalised glyph width data for potential replacement fonts may not be stored but instead calculated as and when required.)

Normalised glyph width data may be stored and associated with a font (or the font's glyphs) in any appropriate way. As one example, a table data structure such as the below may be used in which glyph widths are recorded for font/style combinations:

| Font family | Normalised font style | Glyph | Normalized glyph width |
|---|---|---|---|
| OpenSans | Regular | 'a' | |
| OpenSans | Regular | ... | ... |
| OpenSans | Regular | 'O' | |
| OpenSans | Bold | 'a' | |
| OpenSans | Bold | ... | ... |
| OpenSans | Bold | 'O' | |

In this example, glyphs are identified by an actual letter, however glyphs may be identified by any appropriate identifier (e.g. a Unicode or character code value).

In certain embodiments, the potential replacement fonts are a subset of the entire library of fonts (i.e. all supported fonts) that are accessible to the document editing application 232/server application 214. In this case, the potential replacement fonts will advantageously include a plurality of fonts which have different glyph widths. To illustrate this, consider the four fonts depicted in FIG. 5. FIG. 5 depicts the same text string ("the quick brown fox jumps over the lazy dog") in each of four fonts (Wire One Regular, Open Sans Condensed, Open Sans Regular, Agrandir Grand Regular). Furthermore, for each of the four fonts the text string is rendered using three slightly different character spacing values. As can be seen, the four fonts with the three character spacing values provide a relatively large horizontal variance.

Limiting the potential replacement font families to a subset of all supported font families may be advantageous in reducing the amount of processing that may need to be performed when determining a replacement font family (e.g. as per process 700 described below). In other embodiments, all font families in the font library accessible to the server application/document editing application (i.e. all supported font families) may be designated as potential replacement font families.

The style normalisation data provides, in the present example, a mapping of font style descriptions that may be used in text data that is being converted to internal (i.e. as used by document editing application 232 and/or server application 214) style descriptions. In the present example, the style normalisation data is a map which associates original style descriptions (e.g. as defined by text that is being converted) to internal (normalised) style descriptions. An example of a partial style normalisation map is as follows:

| Original style description | Normalised style description |
|---|---|
| BoldItalics | BOLD_ITALICS |
| BoldItalic | BOLD_ITALICS |
| ItalicBold | BOLD_ITALICS |
| ItalicsBold | BOLD_ITALICS |
| BoldIt | BOLD_ITALICS |
| BoldCondItalics | BOLD_ITALICS |
| BoldCondItalic | BOLD_ITALICS |
| BoldInclined | BOLD_ITALICS |
| CondensedBoldOblique | BOLD_ITALICS |

As can be seen, in this partial example a variety of original style descriptions map (are normalised) to a common internal style description—in this case "BOLD_ITALICS". Style normalisation data may be stored in alternative ways.

The style order data provides a list (or other data structure) of styles ordered by the typical glyph widths that accompany those styles (e.g. from narrowest to widest). As described further below, the style order data allows for a variant style to be selected in the event that the supported fonts data does not define (for a given font) the exact style of the text being converted. Any appropriate data structure may be used for the style order data, for example a list as follows:

```
REGULAR_STYLES = List.of(
    FontStyle.THIN,
    FontStyle.EXTRA_LIGHT,
    FontStyle.LIGHT,
    FontStyle.REGULAR,
    FontStyle.MEDIUM,
    FontStyle.SEMI_BOLD,
    FontStyle.BOLD,
    FontStyle.ULTRA_BOLD,
    FontStyle.HEAVY
);
ITALIC_STYLES = List.of(
    FontStyle.THIN_ITALICS,
    FontStyle.EXTRA_LIGHT_ITALICS,
    FontStyle.LIGHT_ITALICS,
    FontStyle.ITALICS,
    FontStyle.MEDIUM_ITALICS,
    FontStyle.BOLD_ITALICS,
    FontStyle.SEMI_BOLD_ITALICS,
    FontStyle.ULTRA_BOLD_ITALICS,
    FontStyle.HEAVY_ITALICS
);
```

In certain embodiments, the systems and methods described herein generate and make use of replacement font mapping data. Generation and use of such data is described further below. In the embodiments described, the replacement font mapping data includes one or more replacement font mapping records. Each replacement font mapping record provides a mapping between an unsupported font (identified for example, by the font's PostScript name or an alternative font identifier) and a supported font (i.e. a font defined in the supported fonts data). Each record is also associated with a character spacing modifier which indicates any spacing modification that is to be used when converting text in the unsupported font defined by the record to the supported font.

By way of example, each replacement font mapping record may be a triplet such as (<unsupported font family identifier>, <replacement (supported) font family identifier>, <character spacing modifier>). In this case, a replacement font mapping record maps original font families to replacement font families. Font families may be identified by font family names—e.g. ("Calibri", "Arimo", 0.2).

As another example, each replacement font mapping record may be a triplet such as (<unsupported font identifier>, <replacement font identifier>, <character spacing modifier>). In this case, a replacement font mapping record maps original fonts to replacement fonts, e.g. ("Calibri Bold", "Arimo Bold", 0.2).

The character spacing modifier may take a zero value where no spacing adjustment is required, or a positive/negative value depending on whether additional spacing needs to be added or subtracted. In other examples, where a particular replacement font mapping record is associated with a zero spacing modifier that value may be omitted entirely—i.e. a record such as (<unsupported font family identifier>, <replacement (supported) font family identifier>). In this case the absence of a spacing modifier value is interpreted as a 0 spacing modifier value.

Figure 6:
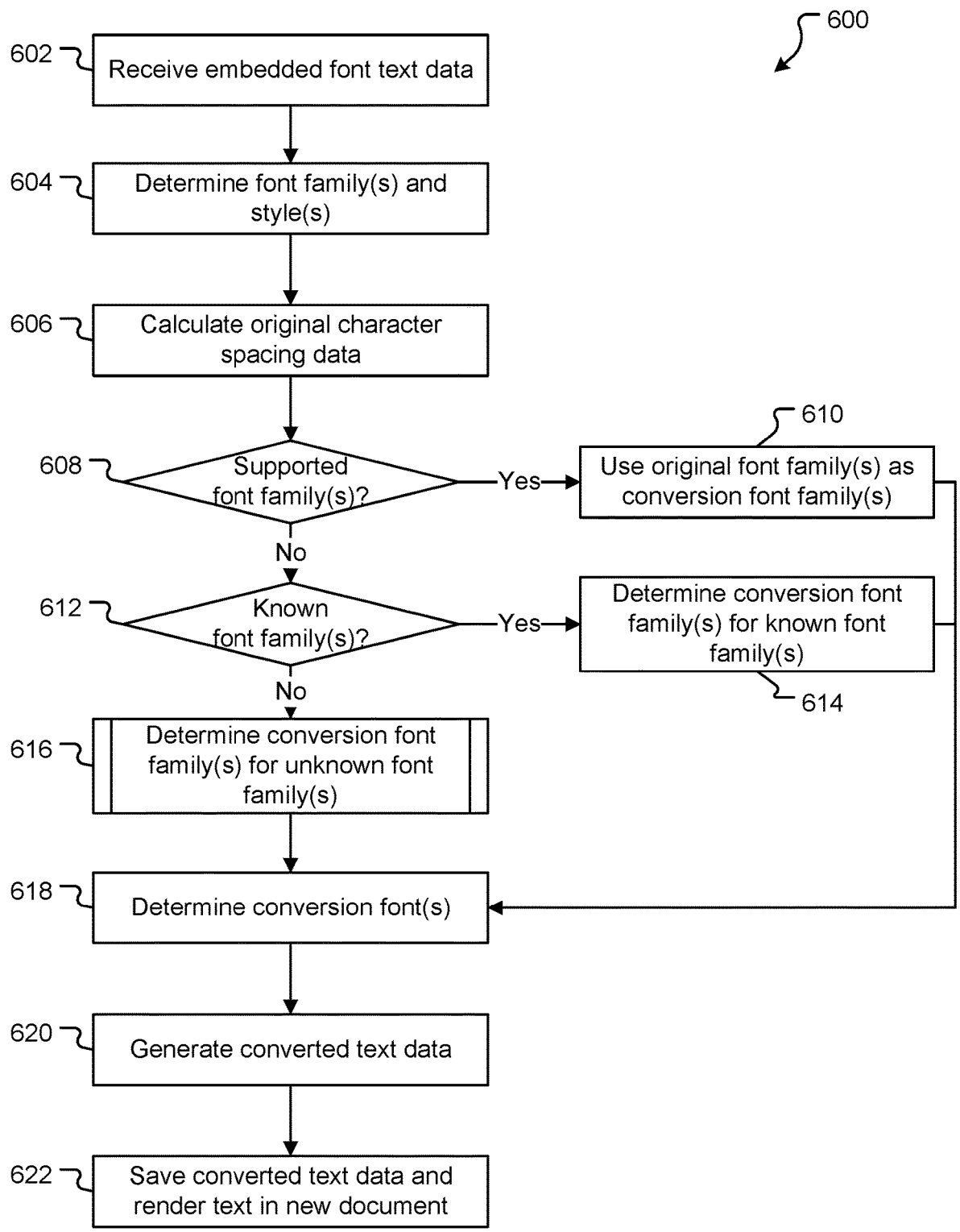
FIG. 6 depicts operations involved in a font conversion process.

Turning to FIG. 6, a font conversion process 600 will be described. The operations performed in process 600 are described as being performed by the server application 214 (shortened to application 214 in this section for simplicity). In alternative embodiments, however, the operations of process 600 could be performed by the document editing application 232 (or by a combination of server application 214 and document editing application 232).

At 602, application 214 receives embedded font text data that is to be converted—e.g. embedded font text data that is to be imported into a new document. This will be referred to as the original text data. The original text data may, for example, be received in response to user input received by the document editing application 232—e.g. activation of an import text control such as 410 described above (leading to the original text data being retrieved from a specified location) or otherwise selecting embedded font text data for import.

The original text data may, for example, be included in a PDF or other format document. In this case the data may be the entirety of the PDF (or other) document or a subset of that data (e.g. one or more pages of the original document or an arbitrary selection of embedded-font text data from the original document).

Generally speaking, the original text data will define a plurality of glyphs. For each glyph that is to be rendered various attributes will be defined. Where the original data is PDF format data, the format is defined in the PDF standard, ISO 32000.

At 604, application 214 determines original fonts associated with the original text data. In the present embodiment this involves determining (where possible) original font families and original font styles.

Where the original text data is PDF data, application 214 attempts to extract the original fonts from the 'PostScriptName' property. PostScript name properties often follows a similar naming pattern, which can be formalised as <fontFamily><separator><styleDescription>—for example "Arimo-BoldItalic" (defining the "Arimo" font family and "BoldItalic" style with a hyphen separator) or "Arimo-Regular" (defining the "Arimo" font family and "Regular" style with a hyphen separator). Other separator characters (underscore, comma, and or others) may also be used.

In some cases, application 214 may not be able to extract font name data for certain text at 604. This will occur, for example, if application 214 cannot parse the PostScript-Name property (for example because it does not exist, does not conform to a recognised format, does not define a recognisable font name/style). In this case, application 214 may attempt to determine the font family/style in alternative ways. By way of example, depending on the type of embedded font there may be other metadata may be accessible to application 214. For instance, for embedded true type fonts, the Name table may provide the font family and font Subfamily (e.g. font style). As a further example, where the original text provides glyph outlines (or glyph outlines can be generated from the original text), application 214 may be configured to compare the original glyph outlines with outlines of corresponding glyphs from supported fonts. If, however, application 214 cannot determine the font for certain text by any available method, it assigns a default font family and style to the glyphs for which the font cannot be identified. Any default font may be used—for example "Arimo", "unidentified font" or any other name that will not map to a supported font.

In certain embodiments, application 214 normalises the original styles associated with the original text data. To do so, application 214 processes each original style to determine if a corresponding normalised style exists. Specifically, application 214 determines if the original style matches a key in the style normalisation map. If so, the extracted original style is converted/renamed to the normalised style associated with that matching key. For example, the PostScriptName property may define a font name of "OpenSans-BoldItalic". With the example style normalisation map described above, application 214 would normalise the "BoldItalic" style to "BOLD_ITALICS". If an original style does not match a key in the style normalisation map (or no original style could be determined from the original text data), application 214 assigns a default style to the glyphs in question (once again a relatively neutral style, such as Regular).

Figure 10:
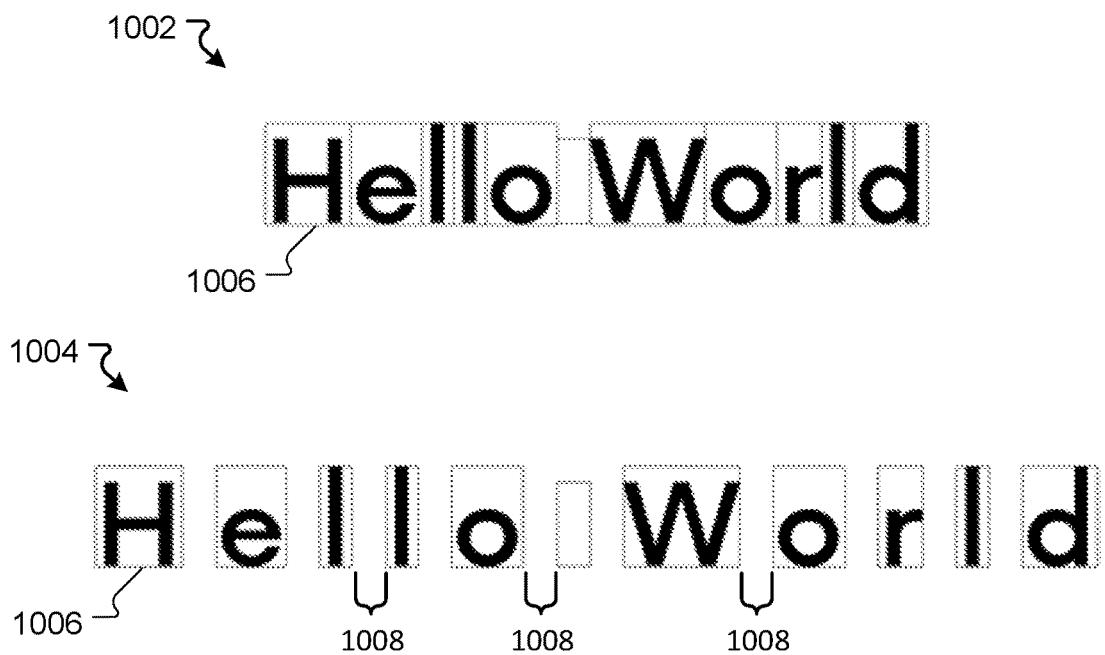
FIG. 10 depicts example text with different character spacings.

At 606, application 214 calculates original character spacing data which, generally speaking, provides data as to the horizontal (for horizontally oriented text) spacing between characters in the original text. The precise data calculated, and the manner in which it is calculated, may vary. In the present embodiments, the original character spacing data includes an average character spacing for each line of original text. The average character spacing for a given line of text is the average of the individual character spacings that exist in that line of text. An individual character spacing is the space between two adjacent characters, and may be calculated based on the characters' horizontal positions. By way of example, the character spacing between first and second adjacent characters may (where the first character is to the left of the second character) be calculated as ((the x-coordinate of the left edge of the second character's normal bounding box)−((the x-coordinate of the right edge of the first character's normal bounding box)). Original character spacing data may alternatively (or additionally) include average character spacing for each paragraph of original text. To illustrate this, FIG. 10 provides two examples 1002 and 1004 of the text string "Hello World". In each example 1002 and 1004, a normal bounding box 1006 is depicted around each character. In example 1002, the character spacing between adjacent characters is 0 em (i.e. there is no space between adjacent characters' bounding boxes). In example 1004, the character spacing 1008 between adjacent characters is 0.3 em.

At 608, for each original font family determined at 604, application 214 determines whether the original font family is a supported font family (in which case processing proceeds to 610) or an unsupported font family (in which case processing proceeds to 612). In the present context, a supported font family is a font family that is supported by application 214 (and defined in the supported fonts data).

At 610, application 214 flags each supported original font family as a font family that does not need to be converted to a new font family: i.e. the original font family can be retained when the original text is converted. Processing then proceeds to 618.

At 612, for each unsupported original font family, application 214 determines whether the unsupported original font family is a known original font family (in which case processing proceeds to 614) or an unknown original font family (in which case processing proceeds to 616).

In the present context, a known font family is an original font family that is not supported by application 214 but for which a matching replacement font mapping record exists. A matching replacement font mapping record will exist where text that makes use of the original font family in question has previously been processed and a matching replacement font mapping record has been generated based on that processing. To identify whether a particular, unsupported original font family is a known font family, application 214 determines if the replacement font mapping data includes a record that associates (in the present example) that particular original font family with a replacement font family.

At 614, application 214 selects a conversion font family for each known original font family based on the replacement font family defined by the relevant replacement font mapping record.

Where a replacement font mapping record defines a non-zero spacing modifier, application 214 also flags this as the spacing modifier that is to be taken into account when replacing the known font family with the replacement font family. Processing then proceeds to 618.

Figure 7:
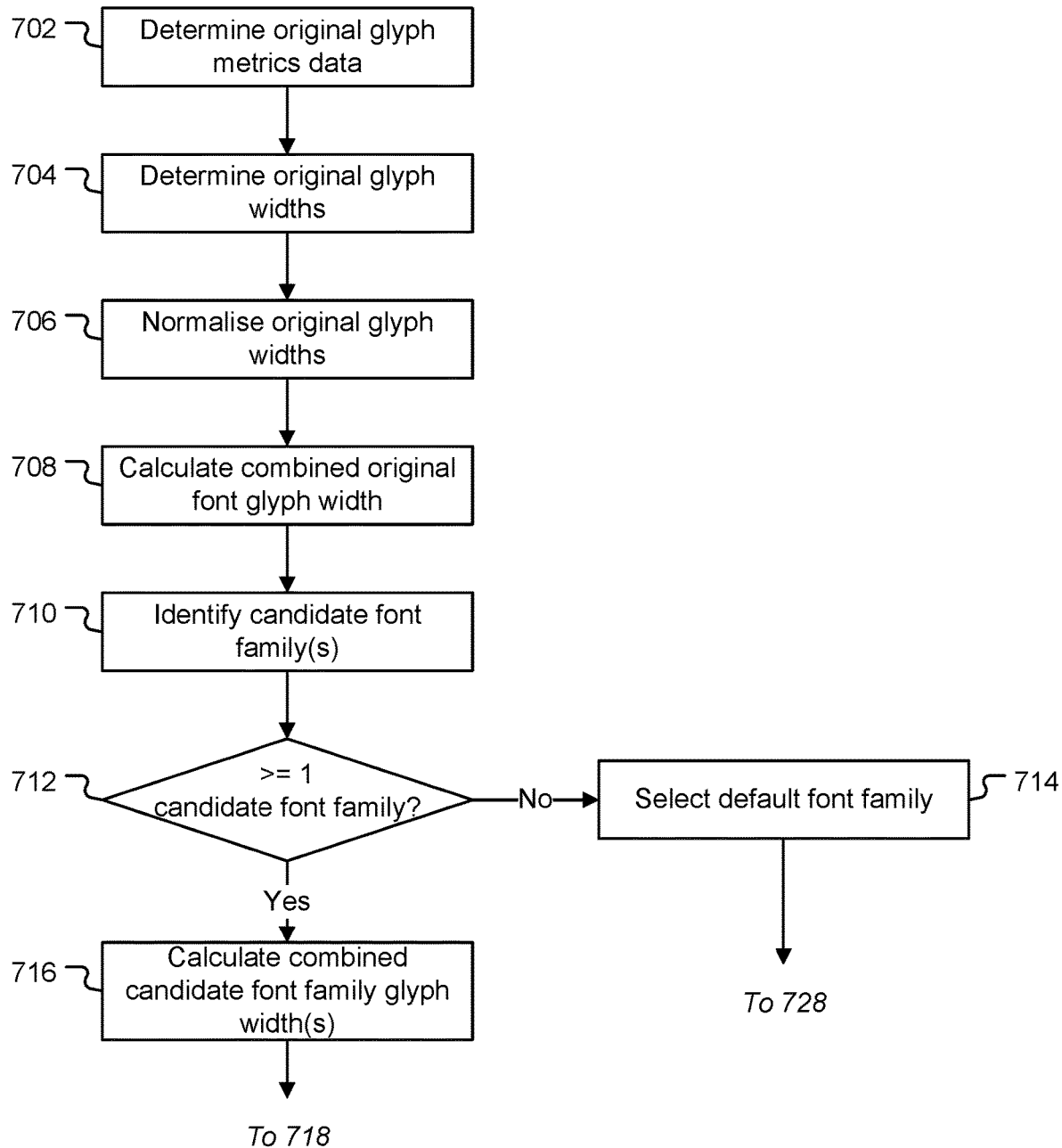
FIGS. 7 and 8 depict operations involved in a replacement font family determination process.

At 616, application 214 determines a replacement font family for each unknown original font family. An example process 700 for selecting a replacement font family for a given unknown original font family is described below with reference to FIGS. 7 and 8. For each unknown original font family, process 700 returns a replacement font mapping record which, in the present embodiments, defines a conversion font family. Processing then proceeds to 618.

At 618, application 214 has determined a conversion font family for each original font family defined in the original text. The conversion font family for a given original font family may be the original font family itself (as selected at 610), a previously known replacement font family (as selected at 614), or a newly identified replacement font family (as determined at 616).

At 618, application 214 determines conversion fonts for each original font defined in the original text. For a given original font, the conversion font is defined by both the conversion font family that has been determined for the original font (e.g. at 610, 614, or 616) and a conversion font style.

Where an original font is being converted to a new font family, the new font family may or may not have a font in the (normalised) style that exactly matches the original font's (normalised) style.

If the supported font family does have a (normalised) font style that matches the original (normalised) font style, the supported font of that style is selected.

If the supported font family does not have a (normalised) font style that matches the original (normalised) font style, application 214 determines a variant style based on the style order data.

To illustrate this, consider an example in which: original text includes the "Calibri-Regular" and "Calibri-UltraBold" fonts; the "Calibri" font family is not supported; application 214 determines (at 614 or 616) that the conversion font family for the "Calibri" font family is the "Arimo" font family; and the supported "Arimo" fonts are "Arimo-Regular" and "Arimo-Bold". In this case, application 214 would determine that original "Calibri-Regular" font text is to be converted to "Arimo-Regular" font text and that original "Calibri-UltraBold" font text is to be converted to "Arimo-Bold" font text ("Arimo-UltraBold" not being a supported font and the style order data defining "Arimo-Bold" as the closest supported font match).

In addition, each conversion font may be associated with a spacing modifier—either '0' for supported font families or (in the present example) as defined in the replacement font mapping record identified at 614 or generated at 616.

By way of illustration, the following table provides an example of font conversion data that has been generated/accessed at 618. In this example, each original font is associated with a conversion font and a spacing modifier:

| Original font | Conversion font | Spacing modifier |
|---|---|---|
| OpenSans Italics | OpenSans Italics | 0 |
| Times New Roman Regular | Arimo Regular | 0.006 |
| Abadi MT Condensed Regular | OpenSans Condensed Regular | 0.005 |

At 620, application 214 generates converted text data. The converted text data is based on the original text data and the font conversion data described above.

If a conversion font is associated with a non-zero spacing modifier, application 214 determines and uses a new character spacing for the affected text based on the spacing modifier. To illustrate this, consider a line of original "Times New Roman Regular text was associated with a character spacing of 0.3 and example font conversion data as described above. In this case application 214 would need to take the spacing modifier (in this example 0.006) into account when converting the "Time New Roman Regular" font text to "Arimo Regular" font text. This would result in the converted line of "Arimo Regular" text having a character spacing of 0.306 (0.3+0.006). Conversely, if the Times New Roman-to-Arimo conversion was associated with a spacing modifier of −0.1, then the converted line of "Arimo Regular" text would have a character spacing of 0.2 (0.3+−0.1).

At 622, application 214 saves the converted text data (e.g. into the document the text is being imported into). Application 214 may save the converted text data to local memory accessible to the client device 230 (such as non-transient memory 310) and/or the server environment 210 (e.g. to data storage 218). When importing the text into a new document application 214 may use the converted text data to render the converted text in the new document—e.g. by causing document editing application 232 to display the converted text on canvas 404.

Once text has been converted, a user may (via document editing application 232) change the font and/or other attributes of the converted text (e.g. style, font size, colour, and/or other attributes). Generally speaking, this will involve the user selecting the text in question and activating one or more text editing controls provided by document editing application 232 in GUI 400.

As described above, at 616 of process 600 application 214 determines a replacement font family for each unknown font family defined in the original text. In the present embodiments, a replacement font family is determined at 616 in accordance with replacement font family determination process 700 which will be described with reference to of FIGS. 7 and 8.

Where multiple unknown font families exist in the original text data, each unknown font family is separately processed according to process 700. Each unknown font family may be processed sequentially (in any order) or in parallel.

In the present embodiments, the data input to process 700 is unsupported font text data that defines one or more original text characters, all of which are in fonts of the same unsupported font family.

At 702, application 214 determines original glyph metrics data. The original glyph metrics data defines original glyphs that are used in the unsupported font text data.

In the present embodiments, the original glyph metrics data includes an identifier of each unique glyph that is used in the unsupported font text data being processed as well as a frequency (or count) indicating how many times that unique glyph is used in the unsupported font text data being processed. In this regard, the same character in different styles results in different glyphs—e.g. unsupported font text data that includes the character 'A' in bold style and 'A' in italic style will result in a set of glyphs that includes a bold 'A' and an italics 'A'. Whitespace characters (e.g. different types of spaces and other with space characters, such as the ASCII whitespace with Unicode char point 32, or the non-breaking whitespace with Unicode char point 160) are ignored and not included in the original glyph metrics data.

The original glyph metrics data may be recorded/stored in various ways. By way of example, however, the original glyph metrics data may be stored in a table-type data set.

To illustrate the original glyph metrics data consider, for example, original embedded font text data defining the text "Hello World" (in the unsupported Times New Roman font family) and "xoxoxoxoxo" (in the unsupported Helvetica font family). (In the event that formatting is lost it is noted that the word "Hello" is in bold, the word "World" is regular text, and the characters "xoxoxoxoxo" are in italics.) In this case, process 700 will be performed twice: once for the unsupported "Times New Roman" font family text and once for the unsupported "Helvetica" font family text.

The original glyph metrics data generated when application 214 performs process 700 for the unsupported font "Times New Roman" text data may be as follows:

| Font family | Font style | Glyph | Glyph count |
|---|---|---|---|
| Times New Roman | Bold | 'H' | 1 |
| Times New Roman | Bold | 'e' | 1 |
| Times New Roman | Bold | 'l' | 2 |
| Times New Roman | Bold | 'o' | 1 |
| Times New Roman | Regular | 'W' | 1 |
| Times New Roman | Regular | 'o' | 1 |
| Times New Roman | Regular | 'r' | 1 |
| Times New Roman | Regular | 'l' | 1 |
| Times New Roman | Regular | 'd' | 1 |

The original glyph metrics data generated when application 214 performs process 700 for the unsupported font "Helvetica" text data may be as follows:

| Font family | Font style | Glyph | Glyph count |
|---|---|---|---|
| Helvetica | Italics | 'x' | 5 |
| Helvetica | Italics | 'o' | 5 |

In these examples, each glyph is represented by a character (e.g. 'H', 'e', etc.). Typically, however, application 214 will be configured to reference each glyph by an identifier—e.g. a character code (which then maps to a Unicode identifier). For example, the glyph 'A' may be represented by the Unicode vale of 65, but have a different character code in each font that it appears—for example Helvetica Regular, Helvetica Bold, Helvetica Italics, etc.

At 704, application 214 determines the glyph width of each style/glyph combination in the original glyph metrics data. Application 214 may be configured to determine the width of a given character (of a given style of a given font) in a variety of ways.

As one example, where a font is a true type font, a lookup table such as the 'hmtx' (horizontal metrix) table can be used. The hmtx table should provide an 'x advance' (or (advanceWidth) value for each glyph which should equal the actual width of the glyph (in font design units).

As another example, for vector fonts in general, a normal bounding box of the path that describes an outline of the glyph could be calculated and the glyph width of the glyph taken as the width of that bounding box.

As a further example, application 214 may determine glyph width by calling the PdfBox library "PDFont.getWidthFromFont(int codepoint)" function (with the character code of the glyph in question as parameter), which will return a glyph width if possible (which will typically be the case for Type 0 Fonts, Type 1 Fonts, True Type Fonts, and Type 3 Fonts). In one implementation, the application 214 is configured to initially try to determine a given glyph width by use of a function such as the "PDFont.getWidthFromFont" function. If this is not successful, the application 214 may then determine the glyph width by calculating the width of a normal bounding box.

At 706, application 214 normalises the original glyph widths determined at 704. In the present example, application 214 is configured to normalise the glyph widths to 1000 units per em. The units per em value is, in this instance, returned by the TrueTypeFont.getUnitsPerEm function. Otherwise a default of 1000 is used.

Continuing with the examples above, normalised glyph widths may, for example, be stored as an additional attribute in the original glyph metrics data. (The un-normalised width may also/alternatively be stored if desired.) E.g.:

| Font family | Font style | Glyph | Glyph count | Normalised glyph width |
|---|---|---|---|---|
| Times New Roman | Bold | 'H' | 1 | 722.17 |
| Times New Roman | Bold | 'e' | 1 | 443.8 |
| Times New Roman | Bold | 'l' | 2 | 227.8 |
| Times New Roman | Bold | 'o' | 1 | 500 |
| Times New Roman | Regular | 'W' | 1 | 943.85 |
| Times New Roman | Regular | 'o' | 1 | 500 |
| Times New Roman | Regular | 'r' | 1 | 333 |
| Times New Roman | Regular | 'l' | 1 | 227.8 |
| Times New Roman | Regular | 'd' | 1 | 500 |

As noted above, normalised glyph widths are (in certain embodiments) calculated and stored for supported fonts in the supported fonts dataset. In this case, normalised glyph widths for supported font glyphs may be determined in the same (or a similar) way to that described with respect to operations 704 and 706.

At 708, application 214 calculates a combined original font glyph width for the glyphs of the unsupported font family being processed. With the example original glyph metrics data above, this involves multiplying the glyph count by the normalised glyph width for all glyphs of the unsupported font family, then summing the results of those multiplications.

The combined original font glyph width for a given unsupported font family is, effectively, the width that the glyphs associated with that font family would occupy if they were rendered in a single line, in an arbitrary order, without white space, with a character spacing of 0, and without taking kerning into account. By dividing the combined original width by the number of original glyphs, an average normalised original glyph width can be calculated.

At 710, application 214 identifies one or more candidate replacement font families (referred to as candidate font families for short). In the present embodiment, application 214 compares the set of glyphs required by the unsupported font family being processed (e.g. as defined in the original glyph metrics data) against the set of glyphs defined for each potential replacement font family (e.g. as defined in the supported fonts data, described above). If a potential replacement font family's glyph set does not define one or more glyphs required by the unsupported font family being processed, that font family is not a candidate font family for the unsupported font family being processed.

In alternative embodiments, application 214 may not require a candidate font family to support all original glyphs. For example, application 214 may select a potential replacement font family if it is missing less than a predefined number of glyphs, and or those missing glyphs relate to less than a predefined number of characters. For example, the original text may define the glyph '&' but only use that glyph once. In this case application 214 may be configured to select a potential replacement font family as a candidate font family even if it does not define the '&' glyph. Conversely, if the '&' glyph was used x times (x being greater than the predefined number of characters), application 214 would not select a font family missing the '&' glyph as a candidate font family. In the above embodiment, candidate font families are identified based on glyph support (e.g. whether the fonts of a given font family support the required glyphs). Application 214 may, however, be configured to take additional factors into account. For example, application 214 could also take the PANOSE classification of a font (if available) into account when identifying candidate fonts at 710, which could assist in choosing serif v sans-serif fonts (among others). Additional and/or alternative factors may be taken into account.

At 712, application 214 determines if at least one candidate font family has been identified. If no candidate font family has been identified processing proceeds to 714. Otherwise processing proceeds to 716.

At 714, application 214 has determined that no candidate font families exist. In this case, application 214 selects a default font family as the replacement font family for the unsupported font family being processed. Application 214 is configured to assign a default font family that is relatively neutral, for example the Arimo font family or any other predefined font family. Processing then proceeds to 728.

At 716, application 214 calculates a combined candidate font family glyph width for each candidate font family identified at 712. To do so, application 214 performs a similar calculation as performed in calculating the combined original font glyph width at 708, excepting the normalised glyph widths of the fonts in the candidate font family are used. In the present example, the normalised candidate font family glyph widths are taken from the supported fonts data.

In some instances, the unsupported font family being processed may define glyphs in a particular (normalised) style that is not supported in a given candidate font family. In this case, application 214 determines a variant style that is supported by the candidate font family and uses the glyphs of the variant style when calculating the combined candidate font glyph width. In the present embodiments, application 214 selects a variant style by reference to style order data as described above. Consider, for example, if the unsupported font family being processed included one or more characters in an "UltraBold" style and a candidate font family (identified at 710) includes a "Semi-Bold" and a "Heavy" style font (but not an "UltraBold" style font). In this case, application 214 would calculate the combined candidate font width using glyphs from the "Heavy" style font of the candidate font family (as this is the closest style to the unsupported "UltraBold" style in the style order data).

Application 214 may, however, be configured with additional (or alternative) rules for determining variant styles. For example, if the original style is an italic style and the candidate font family does not support any italic styles (which may be the case for narrow fonts in particular), application 214 may be configured to select a non-italic variant style. Additionally, or alternatively, application 214 may be configured to take PANOSE attributes into account when selecting a variant style.

Figure 8:
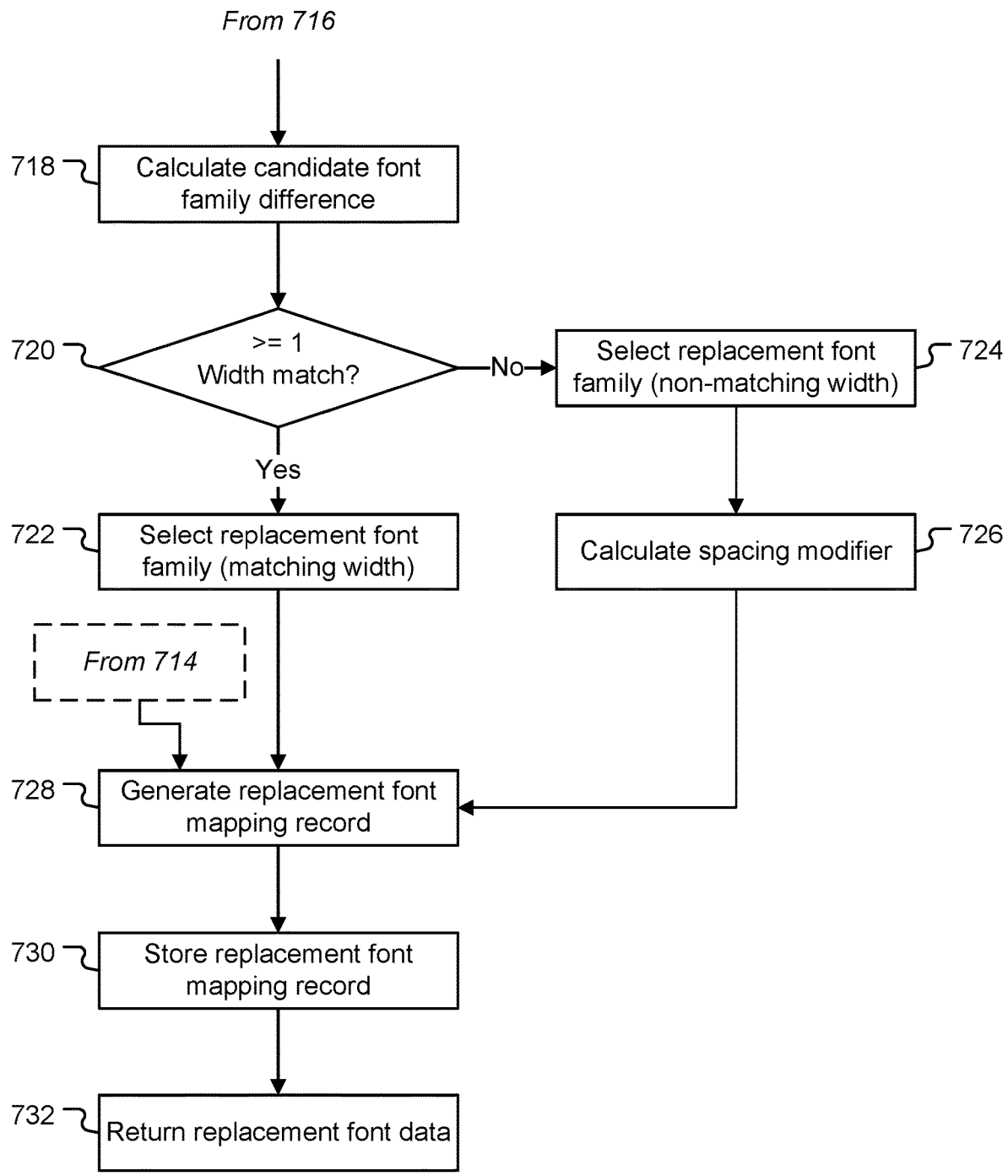

Once combined candidate font glyph widths have been calculated, processing continues to 718 (FIG. 8).

At 718, application 214 calculates a difference for each candidate font family. The difference for a given candidate font family is a measure of how close (or otherwise) the glyphs of the candidate font family are in width to the original font family glyphs. In the present example, difference is calculated as a given candidate font family's combined glyph width (calculated at 716) minus the combined original font glyph width (calculated at 708). A negative difference indicates the candidate font family is (on average) narrower than the original font family. A positive difference indicates that the candidate font family is (on average) wider than the original font family. A zero difference indicates that the width of the candidate font family and original font family is (on average) the same.

At 720, application 214 determines whether one or more candidate font families are a width-match for the unsupported font family being processed. In the present example, a candidate font family is determined to be a width-match if its difference is 0.

If application 214 determines that that at least one candidate font family is a width match, processing proceeds to 722. Otherwise, processing proceeds to 724.

At 722, at least one candidate font family is a width match. In this case, application 214 selects a replacement matching-width font family. If a single candidate font family is a width match, application 214 selects that candidate font family as the replacement font. If more than one candidate font family is a width match, application 214 may select any of the matching candidate font families. Processing then proceeds to 728.

At 724, application 214 has determined that no candidate font family is a width match for the unsupported font family being processed. In the present embodiment, if no candidate font family is a width match, application 214 selects the closest (or equal closest) non-matching candidate font family at 724. This will be the candidate font family with the smallest (or equal smallest) difference. If multiple non-matching candidate font families have the same smallest difference, any of those candidate font families may be selected as the replacement font family. Processing then proceeds to 726.

At 726, application 214 calculates a spacing modifier for the non-matching replacement font family selected at 724. To calculate the spacing modifier, application 214 divides the difference for the selected font by the overall number of original characters (which can, in the present example, be calculated by summing the glyph count from the original glyph metrics data for the unsupported font being processed). This provides an average difference per glyph, which can then be used to modify character spacing in the new document. As the width has been normalised to 1000ths of an em, the average difference per glyph is also in 1000ths of an em. It will be appreciated that the average difference per glyph (and spacing modifier) can be calculated in alternative ways. For example: the combined original font glyph width calculated at 708 may be divided by the number of original characters to provide the average original glyph width; the combined candidate font family glyph width calculated at 716 may be divided by the number of original characters to provide the average candidate font family glyph width; and the average original glyph width may be subtracted from the average candidate font family glyph width. Processing then proceeds to 728.

At 728, application 214 generates a replacement font mapping record. The replacement font mapping record associates the unsupported font family being processed with a replacement font family and (in this embodiment) a spacing modifier. The replacement font family will either be: the default font selected at 714 (in which case a spacing modifier of 0/null is set); the matching replacement font as selected at 722 (in which case a spacing modifier of 0/null is set); or the non-matching replacement font as selected at 724 (in which case the spacing modifier as calculated at 726 is used).

At 730, in the present embodiment, application 214 stores the replacement font mapping record (as part of the replacement font mapping data). In the present embodiment, application 214 stores the record at the server data storage 218. Processing then proceeds to 732.

At 732, application 214 returns replacement font data. The replacement font data defines a replacement font family for the unsupported font family being processed. The replacement font data may define a spacing modifier (which may be zero).

In the operations described above a single replacement font family is identified and automatically selected by application 214 for each unsupported font family. In alternative embodiments, application 214 may be configured to enable identification of more than one viable font family for a given unknown font family and obtain user input selecting a particular replacement font family from the viable font families. Example operations that may be performed to facilitate this are described below.

Where implemented, multiple viable font families may be identified for a given unknown font family at 714, 722, and/or 724.

For example, at 714 application 214 may be configured to select a plurality of default font families in the event that no candidate font families are identified.

By way of further example, if at 720 multiple width-matching candidate font families are identified, application 214 may select all width-matching candidate font families (or up to a predetermined number thereof—e.g. a maximum of 3 width-matching font families). In this case each selected width-matching candidate font family becomes a viable font family.

By way of still further example, instead of selecting only the closest (or equal closest) non-matching candidate font family at 724, application 214 may select multiple non-matching candidate font families (each becoming a viable font family). In this case, application 214 may be configured to select a maximum number of non-matching candidate font families that are within a defined difference of the unknown font family being processed—e.g. up to n candidate font families which have a font difference between defined minimum and maximum differences x and y. Any appropriate values for n, x, and y may be selected, for example, up to 3 fonts with a difference between −0.1 and 0.4 em. For each non-matching candidate font family selected, application 214 would then calculate an associated spacing modifier at 726.

Where multiple viable font families are identified, application 214 may also generate and store replacement font mapping records for each viable font family identified (at 728 and 730), and return replacement font data for the multiple viable font families (at 732).

Figure 9:
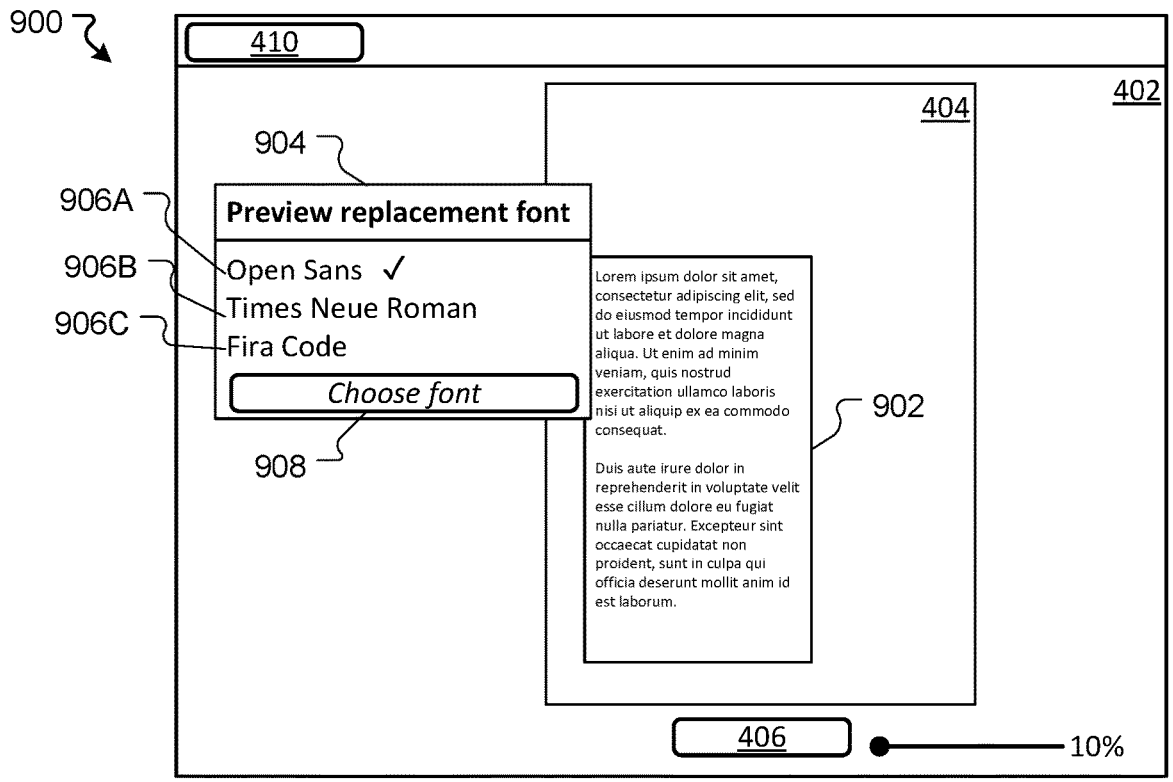
FIG. 9 depicts an example graphical user interface.

Furthermore, where a single unsupported font may match multiple replacement font mapping records, application 214 may identify multiple viable font families for a given known font family at 614.

Where application 214 identifies multiple viable font families for a given unsupported font family, it may cause application 232 to generate user interface elements that allow a user to select one of the viable font families for the given unsupported font family. This may be achieved in various ways, one example of which is depicted in GUI 900 of FIG. 9 (which document editing application 232 causes to be displayed at client system 230).

GUI 900 depicts text 902 being converted and imported into a new document. In this example, text 902 is in an unsupported font and application 232 has identified three viable font families ("Open Sans", "Times Neue Roman", and "Fira Code"). These three viable font families may have been identified at 614 (as known replacement font families) or at 616. Having identified multiple viable font families, application 214 causes document editing application 232 to display the text 902 in one of these replacement font families (Opens Sans in this instance). Additionally document editing application 232 displays a font selector UI element 904 which provides a font preview control 906 for each of the viable fonts. A user can activate a font preview control 906 to select a different replacement font family to preview (a change font preview user input). In response to a change font preview input, document editing application 232 displays the text 902 in the replacement font family selected by the user (including any modified character spacing associated with the replacement font family). For example, if in FIG. 8 a user selected font preview control 906B (e.g. a first user input), document editing application 232 would display the text 902 in the Times New Roman font family (and the particular style that has been determined to match the type of the original text). In addition, the character spacing of text 902 is determined based on the original character spacing data (calculated at 606) and the relevant character spacing modifier (associated with the replacement font family). This provides the user with a preview of how the text 902 will appear in the replacement font family, and allows the user to compare the appearance of the text when rendered using different replacement font families. Once a user has decided on a particular replacement font family for the text in question they may activate a choose font family control such as 908 (e.g. a second user input). In response to detecting activation of the choose font family control, application 232 selects the replacement font family currently selected in the font selector UI element 904 as the replacement font family for the text 902 in question.

In the embodiments described above, replacement font families are identified (and replacement font mapping data generated) by processing font-embedded text that is being imported into a new document. This process may be performed (or be adapted to be performed) solely for the purpose of generating replacement font mapping records.

For example, training text may be generated and used to create multiple embedded font training text files that define the training text in different font families and styles (font families that are unknown to application 232). Each of the training text files can then be processed by application 232 (for example as described above) to generate replacement font mapping records that map the unsupported font families used in the training text files to supported font families. This may improve responsiveness of application 214 (and, ultimately, document editing application 232), as more known font families will be identified at 612 (and, consequently, fewer unsupported font families will need to be processed on the fly).

In order to generate training text, application 214 (or any other application) may automatically generate training text of a defined length (e.g. n characters) based on statistics as to the frequency at which characters (potentially including upper and lower case for letters and/or character groups) occur in the language in which the training text is written. Alternatively, training text may be manually generated (or taken from an existing document). Once training text has been generated, training text files may be generated by saving the text in different fonts that are not supported (or already known) by the application for which the replacement font mapping records are to be generated.

In the embodiments described above replacement font mapping data is persistently stored. In this case, application 214 may be configured to detect when new font families are installed (and thus become supported font families). The installation of new font families may cause replacement font data records to be sub-optimal (in that a new font family may provide a better mapping for a previously mapped unsupported font family). In this case, application 214 may trigger a replacement font mapping data update when new font families are installed. This may involve deleting all (or a subset) of the replacement font mapping records, and/or generating new replacement font mapping records (for example by reprocessing training text as described above).

In alternative embodiments, replacement font mapping data is not persistently stored and, accordingly, application 214 does not check for known fonts at 612, and does not generate/store replacement font mapping records at 728/730.

In the above embodiments the majority of operations are described as being performed by the server application 214 of the server environment 210. Variations are, however, possible. For example in certain cases an operation described as being performed by server application 214may be performed by the document editing application 232. Generally speaking, however, where user input is required such user input is initially received at client system 230 (by an input device thereof). Data representing that user input may be processed by one or more applications running on client system 230 or may be communicated to server environment 210 for one or more applications running on the server hardware 212 to process. Data or information that is to be output by client system 230 (e.g. via display, speaker, or other output device) will ultimately involve that system 230. The data/information that is output may, however, be generated (or based on data generated) by document editing application 232 and/or the server environment 210 (and communicated to the client system 230 to be output).

Furthermore, in certain implementations a computer processing system 300 may be configured (by an application running thereon) to perform the processing described herein entirely independently of a server environment 210. In this case, the application running on that system is a stand-alone application and all instructions and data required to perform the operations described above are stored on that system 230.

The following numbered clauses provide further examples of embodiments described herein.

Clause 1. A computer implemented method including:
receiving embedded font text, the embedded font text defining characters associated with an original font family, the original font family being an unsupported font family;
processing the embedded font text to generate original glyph metrics data, the original glyph metrics data defining glyphs used in the embedded font text;
calculating a combined original font glyph width based on the original glyph metrics data;
identifying one or more candidate font families, each candidate font family associated with a plurality of candidate font family glyphs;
for each candidate font family:
calculating a combined candidate font family glyph width, the combined candidate font family glyph width being based on the candidate font family's candidate font family glyphs and the original glyph metrics data;
calculating a candidate font family difference, the candidate font family difference being a measure of how the candidate font family's combined candidate font family glyph width compares to the combined original font glyph width; and
selecting a particular candidate font family as a replacement font family based on the candidate font family differences of the one or more candidate font families.

Clause 2. The computer implemented method of clause 1, wherein the original glyph metrics data defines each unique glyph used in the embedded font text and a count of the number of times each unique glyph is used in the embedded font text.

Clause 3. The computer implemented method of clause 1 or clause 2, wherein calculating the combined original font glyph width includes:
determining an original glyph width for each unique glyph defined in the original glyph metrics data; and
calculating the combined original font glyph width based on the original glyph widths.

Clause 4. The computer implemented method of ant one of clauses 1 to 3, wherein calculating the combined candidate font family glyph width for a given candidate font family includes:
determining candidate font family glyph widths for each candidate font family glyph that corresponds to a glyph used in the embedded font text; and
calculating the combined candidate font family glyph width based on the candidate font family glyph widths.

Clause 5. The computer implemented method of any one of clauses 1 to 4, wherein calculating the candidate font family difference for a given candidate font family includes subtracting the combined original font glyph width from the combined candidate font family glyph width.

Clause 6. The computer implemented method of any one of clauses 1 to 5, further including calculating a spacing modifier for the particular candidate font family, the spacing modifier defining a value that is used to determine converted text character spacing when converting the embedded font text from the original font family to the replacement font family.

Clause 7. The computer implemented method of clause 6, wherein the spacing modifier for the particular candidate font family is based on the particular candidate font's difference.

Clause 8. The computer implemented method of any one of clauses 1 to 7, further including:
generating a replacement font mapping record, the replacement font mapping record including an identifier of the original font family and an identifier of the replacement font family; and
causing the replacement font mapping record to be persistently stored.

Clause 9. The computer implemented method of clause 8 when dependent on clause 6 or clause 7, wherein the replacement font mapping record further includes the spacing modifier.

Clause 10. The computer implemented method of any one of clauses 1 to 9, further including generating converted text data in which the embedded font text is converted to text of the replacement font family.

Clause 11. The computer implemented method of clause 10 when dependent on clause 6 or clause 7, wherein generating converted text data includes adjusting character spacing of the embedded font text based on the spacing modifier.

Clause 12. The computer implemented method of clause 10 or clause 11, further including causing converted text to be displayed in accordance with the converted text data.

Clause 13. The computer implemented method of any one of clauses 1 to 12, wherein selecting a particular candidate font family as a replacement font family includes:
identifying a first viable candidate font family and a second viable candidate font family;
generating first converted text data in which the embedded font text is converted to the first viable candidate font family;
generating second converted text data in which the embedded font text is converted to the second viable candidate font family;
causing first converted text in accordance with the first converted text data to be displayed in a user interface;
receiving first user input; and
in response to the first user input, causing second converted text in accordance with the second converted text data to be displayed in the user interface.

Clause 14. The computer implemented method of clause 13, further including:
receiving second user input choosing the second viable candidate font family; and
in response to the second user input, selecting the second viable candidate font family as the replacement font family.

Clause 15. A computer implemented method for importing original text into an application, the original text being embedded font text, the method including:

receiving the original text;
determining an original font family associated with one or more characters of the original text;
determining that the original font family is an unsupported font family that is not supported by the application;
in response to determining that the original font family is an unsupported font family:
determining if the original font family is a known font family by accessing replacement font mapping data, the original font family being a known font family if it is referenced in the replacement font mapping data; and
in response to determining that the original font family is a known font family, generating converted text data by:
selecting a replacement font family, the replacement font family being a supported font family that is associated with the original font family in the replacement font mapping data;
converting the one or more characters of the original text to the selected replacement font family; and
using a spacing modifier to determine a spacing of the one or more characters in the converted text data, the spacing modifier associated with the original font family and the selected replacement font family in the replacement font mapping data.

Clause 16. The computer implemented method according to clause 15, wherein the replacement font mapping data includes a plurality of replacement font mapping records, each replacement font mapping record associating an unsupported font family with a supported font family.

Clause 17. The computer implemented method according to clause 16, wherein each replacement font mapping record further includes a spacing modifier.

Clause 18. The computer implemented method of any one of clauses 15 to 17, further including causing converted text to be displayed in accordance with the converted text data.

Clause 19. The computer implemented method according to any one of clauses 15 to 18, wherein selecting a replacement font family includes:
identifying a first viable font family and a second viable font family, the first and second viable font family being supported font family that are associated with the original font family in the replacement font mapping data;
generating first converted text data in which the embedded font text is converted to the first viable font family;
generating second converted text data in which the embedded font text is converted to the second viable font family;
causing first converted text in accordance with the first converted text data to be displayed in a user interface;
receiving first user input; and
in response to the first user input, causing second converted text in accordance with the second converted text data to be displayed in the user interface.

Clause 20. The computer implemented method of clause 19, further including:
receiving second user input choosing the second viable font family; and
in response to the second user input, selecting the second viable font family as the replacement font family.

Clause 21. The computer implemented method according to any one of clauses 15 to 20, wherein in response to determining that the original font family is not a known font family the method further includes determining a replacement font family by performing the method of any one of clauses 1 to 9.

Clause 22. A computer processing system including:
a processing unit; and
a non-transient computer-readable storage medium storing instructions, which when executed by the processing unit, cause the processing unit to perform the method according to any one of clauses 1 to 21.

Clause 23. A non-transient storage medium storing instructions executable by processing unit to cause the processing unit to perform the method according to any one of clauses 1 to 21.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

The present disclosure uses terms "first," "second," etc. to describe various elements. Unless explicitly stated otherwise, these terms are used only to distinguish elements from one another and not in an ordinal sense. For example, a first font family could be termed a second font family or vice versa without departing from the scope of the described examples. Furthermore, when used to differentiate elements or features, a second feature (e.g. a second font family) could exist without a first feature (e.g. a first font family).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
receiving embedded font text, the embedded font text defining characters associated with an original font family, the original font family being an unsupported font family;
processing the embedded font text to generate original glyph metrics data, the original glyph metrics data defining each unique glyph used in the embedded font text and a count of the number of times each unique glyph is used in the embedded font text;
calculating a combined original font glyph width based on the original glyph metrics data;

identifying one or more candidate font families, each candidate font family associated with a plurality of candidate font family glyphs;

for each candidate font family:
calculating a combined candidate font family glyph width, the combined candidate font family glyph width being based on the candidate font family's candidate font family glyphs and the original glyph metrics data;
calculating a candidate font family difference, the candidate font family difference being a measure of how the candidate font family's combined candidate font family glyph width compares to the combined original font glyph width; and selecting a particular candidate font family as a replacement font family based on the candidate font family differences of the one or more candidate font families.

2. The computer implemented method of claim 1, wherein calculating the combined original font glyph width includes:
determining an original glyph width for each unique glyph defined in the original glyph metrics data; and
calculating the combined original font glyph width based on the original glyph widths.

3. The computer implemented method of claim 1, wherein calculating the combined candidate font family glyph width for a given candidate font family includes:
determining candidate font family glyph widths for each candidate font family glyph that corresponds to a glyph used in the embedded font text; and
calculating the combined candidate font family glyph width based on the candidate font family glyph widths.

4. The computer implemented method of claim 1, wherein calculating the candidate font family difference for a given candidate font family includes subtracting the combined original font glyph width from the combined candidate font family glyph width.

5. The computer implemented method of claim 1, further including calculating a spacing modifier for the particular candidate font family, the spacing modifier defining a value that is used to determine converted text character spacing when converting the embedded font text from the original font family to the replacement font family.

6. The computer implemented method of claim 5, wherein the spacing modifier for the particular candidate font family is based on the candidate font family difference calculated for the particular candidate font family.

7. The computer implemented method claim 1, further including:
generating a replacement font mapping record, the replacement font mapping record including an identifier of the original font family and an identifier of the replacement font family; and
causing the replacement font mapping record to be persistently stored.

8. The computer implemented method of claim 1, further including generating converted text data in which the embedded font text is converted to text of the replacement font family.

9. The computer implemented method of claim 1, wherein selecting a particular candidate font family as a replacement font family includes:
identifying a first viable candidate font family and a second viable candidate font family;
generating first converted text data in which the embedded font text is converted to the first viable candidate font family;
generating second converted text data in which the embedded font text is converted to the second viable candidate font family;
causing first converted text in accordance with the first converted text data to be displayed in a user interface;
receiving first user input; and
in response to the first user input, causing second converted text in accordance with the second converted text data to be displayed in the user interface.

10. A computer processing system including:
a processing unit; and
a non-transient computer-readable storage medium storing instructions, which when executed by the processing unit, cause the processing unit to perform a method including:
receiving embedded font text, the embedded font text defining characters associated with an original font family, the original font family being an unsupported font family;
processing, by the processing unit, the embedded font text to generate original glyph metrics data, the original glyph metrics data defining each unique glyph used in the embedded font text and a count of the number of times each unique glyph is used in the embedded font text;
calculating a combined original font glyph width based on the original glyph metrics data;
identifying one or more candidate font families, each candidate font family associated with a plurality of candidate font family glyphs;
for each candidate font family:
calculating a combined candidate font family glyph width, the combined candidate font family glyph width being based on the candidate font family's candidate font family glyphs and the original glyph metrics data;
calculating a candidate font family difference, the candidate font family difference being a measure of how the candidate font family's combined candidate font family glyph width compares to the combined original font glyph width; and
selecting a particular candidate font family as a replacement font family based on the candidate font family differences of the one or more candidate font families.

11. The computer processing system of claim 10, wherein calculating the combined original font glyph width includes:
determining an original glyph width for each unique glyph defined in the original glyph metrics data; and
calculating the combined original font glyph width based on the original glyph widths.

12. The computer processing system of claim 10, wherein calculating the combined candidate font family glyph width for a given candidate font family includes:
determining candidate font family glyph widths for each candidate font family glyph that corresponds to a glyph used in the embedded font text; and
calculating the combined candidate font family glyph width based on the candidate font family glyph widths.

13. The computer processing system of claim 10, wherein the method further includes calculating a spacing modifier for the particular candidate font family, the spacing modifier defining a value that is used to determine converted text character spacing when converting the embedded font text from the original font family to the replacement font family.

14. The computer processing system of claim 13, wherein the spacing modifier for the particular candidate font family is based on the candidate font family difference calculated for the particular candidate font family.

* * * * *